US012704276B2

(12) United States Patent
Kim et al.

(10) Patent No.: US 12,704,276 B2
(45) Date of Patent: Aug. 11, 2026

(54) HUMIDIFIER

(71) Applicant: LG ELECTRONICS INC., Seoul (KR)

(72) Inventors: Yongmin Kim, Seoul (KR); Dongryul Park, Seoul (KR); Chiyoung Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 226 days.

(21) Appl. No.: 18/538,059

(22) Filed: Dec. 13, 2023

(65) Prior Publication Data

US 2024/0200810 A1 Jun. 20, 2024

(30) Foreign Application Priority Data

Dec. 19, 2022 (KR) ........................ 10-2022-0177800

(51) Int. Cl.

| | |
|---|---|
| ***F24F 6/16*** | (2006.01) |
| ***B01F 23/21*** | (2022.01) |
| *F24F 6/00* | (2006.01) |

(52) U.S. Cl.

CPC ................ *F24F 6/16* (2013.01); *B01F 23/21* (2022.01); *B01F 23/214* (2022.01); *F24F 2006/008* (2013.01)

(58) Field of Classification Search

CPC ............ F24F 6/16; B01F 23/21; B01F 23/214

See application file for complete search history.

(56) References Cited

U.S. PATENT DOCUMENTS

| | | | |
|---|---|---|---|
| 5,645,769 A | 7/1997 | Tamaru et al. | |
| 6,244,576 B1 | 6/2001 | Tsai | |

FOREIGN PATENT DOCUMENTS

| | | | |
|---|---|---|---|
| CN | 211600985 | 9/2020 | |
| EP | 2860464 | 4/2015 | |
| JP | 2012-042161 | 3/2012 | |
| KR | 10-1276044 | 6/2013 | |
| KR | 101805814 B1 * | 12/2017 | ............. F24F 13/28 |
| WO | WO 2021/164366 | 8/2021 | |

OTHER PUBLICATIONS

European Search Report dated May 22, 2024 issued in Application No. 23217820.2.

European Office Action dated May 29, 2026 issued in Application No. 23217820.2.

* cited by examiner

*Primary Examiner* — Robert A Hopkins

(74) *Attorney, Agent, or Firm* — KED & ASSOCIATES, LLP

(57) ABSTRACT

The present disclosure relates to a humidifier. A humidifier according to one aspect of the present disclosure includes: a case with an intake opening; a discharge opening that opens toward the outside of the case; a fan disposed inside the case; a humidification assembly including a humidification chamber where mist is produced and an outlet through which the mist produced in the humidification chamber flows; a humidification flow path to which mist released through the outlet is admitted, and which extends from the top of the outlet and connects to the discharge opening; and guide disposed between the outlet and the humidification flow path and including a guide wall that slopes upward toward the humidification flow path from the outlet. Thus, the mist discharged from the outlet can be guided upward.

19 Claims, 17 Drawing Sheets

HUMIDIFIER

CROSS-REFERENCE TO RELATED PATENT APPLICATIONS

This application claims priority to Korean Patent Application No. 10-2022-0177800, filed Dec. 19, 2022, whose entire disclosures are hereby incorporated by reference.

BACKGROUND

Field

The present disclosure relates to a humidifier, and more particularly, to a humidifier that has a discharge opening extending along the circumference of a case.

Related Art

A humidifier is an appliance that supplies moisture-containing air within a room. The humidifier is equipped with a water reservoir for storing water, and converts the water stored in the water reservoir into mist ultrasonically, by heating, by natural evaporation, or in a hybrid manner.

The humidifier includes a case internally having a space, a fan disposed inside the case, and a discharge opening through which atomized humidified air is discharged.

The discharge opening in the humidifier may extend along the circumference of the case, in order to increase the amount of mist released and widen the surface area over which water is supplied.

However, conventional humidifiers are problematic in that humidified air cannot be released uniformly through the discharge opening extending along the circumference of the case. As such, irregular amounts of mist are supplied depending on where the humidifier is placed.

Another problem with conventional humidifiers is that water drops formed on parts inside the case are hard to remove. Especially in the case of a discharge opening that extends quite a distance, the water formed along the circumference of the discharge opening may remain in the case, leading to poor hygiene in the humidifier.

PRIOR ART DOCUMENTS

Patent Documents (Patent Document 0001) Korean Patent Document 10-1995-011989
(Patent Document 0002) Korean Patent Document 10-1995-0010132

SUMMARY

The present disclosure is directed to overcoming the above problems and others.

Another aspect of the present disclosure is to form a discharge opening along the circumference of a case.

Yet another aspect of the present disclosure is to supply humidified air uniformly through a discharge opening that extends a quite a distance.

A further aspect of the present disclosure is to distribute humidified air uniformly along the circumference of the discharge opening.

A further aspect of the present disclosure is to minimize flow resistance in a flow path.

A further aspect of the present disclosure is to simplify the structure of guide parts.

A further aspect of the present disclosure is to facilitate the removal of residual water in the device.

A further aspect of the present disclosure is to make the hygiene control of the humidifier easier.

The aspects of the present disclosure are not limited to the foregoing, and other aspects not mentioned herein will be able to be clearly understood by those skilled in the art from the following description.

To accomplish the foregoing aspects, a humidifier according to an aspect of the present disclosure includes: a case with an intake opening.

The humidifier includes a discharge opening that opens toward the outside of the case.

The humidifier includes a fan disposed inside the case.

The humidifier includes a humidification assembly including a humidification chamber where mist is produced and an outlet through which the mist produced in the humidification chamber flows.

The humidifier includes a humidification flow path to which mist released through the outlet is admitted, and which extends from the top of the outlet and connects to the discharge opening.

The humidifier includes a guide disposed between the outlet and the humidification flow path and including a guide wall that slopes upward toward the humidification flow path from the outlet. Thus, mist can be guided to the humidification flow path by the guide.

The guide may project in a direction away from the humidification flow path.

The outlet may be connected to the bottom of the guide.

The guide may include a guide intake portion connecting the outlet and the guide wall.

The guide may include a guide intake hole formed through the guide intake portion, that communicates with the inside of the humidification chamber.

The guide may include a guide side wall that extends upward from the guide wall and is positioned radially outward from the humidification flow path.

The guide may have a downwardly projecting conical shape, and may have a space surrounded by the guide wall.

The outlet may be connected to the guide, at a position spaced from the center of the guide.

The guide wall may include a first guide portion positioned in a direction away from the center of the guide with respect to the outlet.

The guide wall may include a second guide portion positioned in a direction toward the center of the guide with respect to the outlet.

The angle of inclination of the first guide portion may be larger than the angle of inclination of the second guide portion.

The humidifier may further include a water reservoir that supplies water to the humidification assembly, spaced upward from the outlet.

The humidifier may further include an inner case spaced radially outward form the water reservoir, between which and the water reservoir the humidification flow path is formed.

The guide may be disposed between the water reservoir and the humidification assembly and attached to the inner case.

The water reservoir may include a water reservoir lower wall vertically facing the outlet.

The humidification flow path may be formed radially outward from the water reservoir lower wall.

The humidifier may further include a guide rim protruding toward the humidification flow path from the water reservoir and extending along the circumference of the water reservoir.

The guide may include a guide side wall protruding upward from the guide wall.

The guide may include an edge connecting the guide wall and the guide side wall.

The guide rim may horizontally face the edge.

The length the guide rim protrudes toward the humidification flow path may become larger as the guide rim becomes closer to the outlet.

The guide may include a coupling body spaced upward from the outlet, over which the water reservoir is mounted.

The guide may include a coupling plate where the water reservoir is mounted.

The guide may include a support rib protruding upward from the coupling plate.

The humidification flow path may be formed between the guide side wall and the coupling body.

A humidifier according to an aspect of the present disclosure includes: a case with an intake opening; a discharge opening that opens toward the outside of the case; a fan disposed inside the case; a humidification assembly including a humidification chamber where mist is produced and an outlet through which the mist produced in the humidification chamber flows; a water reservoir that supplies water to the humidification assembly, spaced upward from the outlet; a humidification flow path formed between the outlet and the discharge opening, that extends to surround the water reservoir; and a guide rim protruding toward the humidification flow path from the water reservoir and extending in the direction in which the humidification flow path extends, wherein the length the guide rim protrudes toward the humidification flow path becomes larger as the guide rim becomes closer to the outlet. Thus, mist can be distributed uniformly throughout the humidification flow path by the guide rim.

The guide rim may protrude from the water reservoir lower wall, radially outward from the water reservoir.

The humidification flow path may have a cylindrical shape that surrounds the water reservoir.

The guide rim may be disposed at the bottom of the humidification flow path and have a ring shape.

The guide rim may include a first rim portion positioned higher than the outlet.

The guide rim may include a second rim portion formed farther away from the outlet than the first rim portion.

The length the first rim portion protrudes may be larger than the length the second rim portion protrudes.

Specific details of other embodiments are included in the detailed description and the drawings.

According to at least one of the embodiments of the present disclosure, a ring-shaped discharge opening can be formed along the circumference of a cylindrical case.

According to at least one of the embodiments of the present disclosure, humidified air can be distributed uniformly along the circumference of the discharge opening by attaching a guide to the outlet of the humidification assembly.

According to at least one of the embodiments of the present disclosure, humidified air can be distributed uniformly by means of ribs disposed above the outlet.

According to at least one of the embodiments of the present disclosure, a flow path structure can be simplified by adjusting the distance between the inner case and the ribs.

According to at least one of the embodiments of the present disclosure, humidified air can be guided smoothly in a given direction by adjusting the distance between the guide and the water reservoir lower wall.

According to at least one of the embodiments of the present disclosure, the water in the case can be collected in the humidification assembly due to a sloping structure of the guide.

The effects of the present disclosure are not limited to the foregoing, and other effects not mentioned herein will be able to be clearly understood by those skilled in the art from the following description.

DESCRIPTION OF EXEMPLARY EMBODIMENTS

Figure 1:
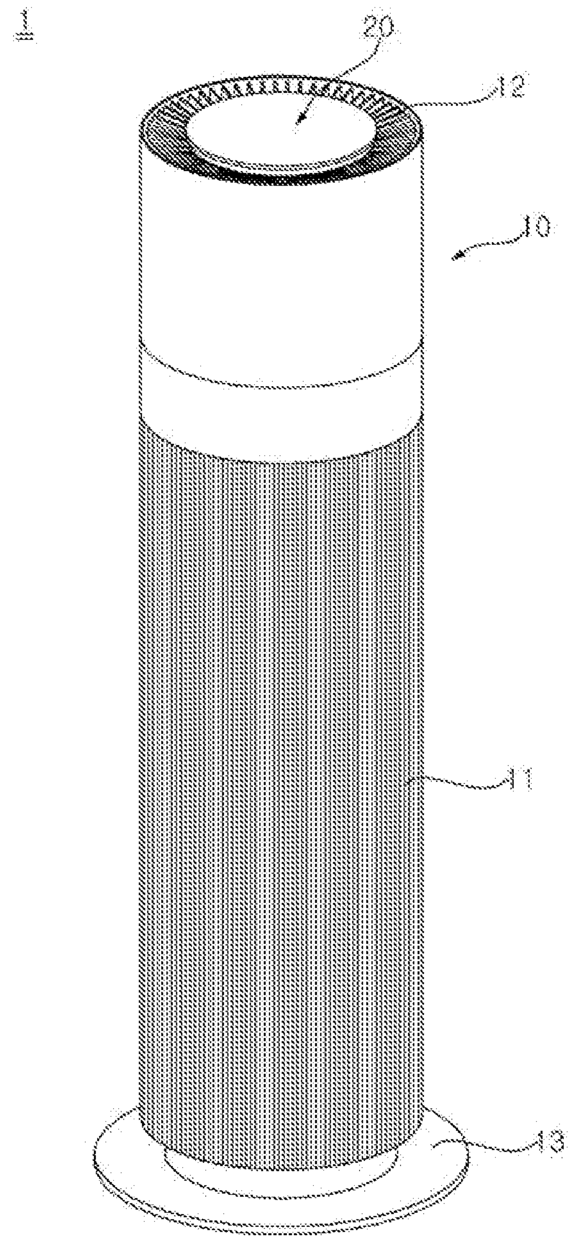
FIG. 1 is a perspective view of a humidifier according to an embodiment of the present disclosure.

Hereinafter, the embodiments disclosed in the present specification will be described in detail with reference to the accompanying drawings. The same or similar elements will be assigned the same reference numerals irrespective of the reference numerals, and redundant descriptions thereof will be omitted.

The suffixes "module" and "unit" for elements used in the following embodiments are given or interchangeably used in consideration of only the ease of drafting the specification and do not have a meaning or role distinct from each other.

In describing the embodiments disclosed in the present specification, a detailed description of a related known technology will be omitted when it is deemed that it may unnecessarily obscure the subject matter of the present disclosure. Also, it should be understood that the appended drawings are intended only to help understand the embodiments disclosed in the present specification and do not limit the technical idea disclosed in the present disclosure; rather, it should be understood that all changes, equivalents, and substitutions included in the technical scope and spirit of the present disclosure are included.

Terms such as ‘first’, ‘second’, etc., may be used to describe various components, but the components are not to be construed as being limited to the terms. The terms are used only to distinguish one component from another component.

It is to be understood that when one element is referred to as being “connected to” or “coupled to” another element, it may be connected directly to or coupled directly to another element or be connected to or coupled to another element, having the other element intervening therebetween. On the other hand, it is to be understood that when one element is referred to as being “connected directly to” or “coupled directly to” another element, it may be connected to or coupled to another element without the other element intervening therebetween.

The singular expressions may include plural expressions unless the context clearly dictates otherwise.

Referring to FIG. 1, a humidifier 1 will be described.

FIG. 1 is a perspective view of the humidifier 1.

The humidifier 1 may include a case 10. The case 10 may internally have a space. The case 10 may be cylindrical.

The humidifier 1 may include an intake opening 11. The intake opening 11 may be formed around the circumference of the case 10. Air from outside the humidifier 1 may enter the case 10 through the intake opening 11.

The humidifier 1 may include a discharge opening 12. The discharge opening 12 may be formed on the top of the case 10. Air drawn into the case 10 may be discharged out of the case 10 through the discharge opening 12.

The humidifier 1 may include a base 13. The base 13 may be disposed at the bottom of the case 10. The base 13 may have a larger diameter than the case 10.

The humidifier 1 may include a water reservoir 20. The water reservoir 20 may be disposed inside the case 10. A space for storage of water may be formed inside the water reservoir 20. The discharge opening 12 may be formed radially outward from the water reservoir 20. The discharge opening 12 may be formed to surround the water reservoir 20.

Figure 2:
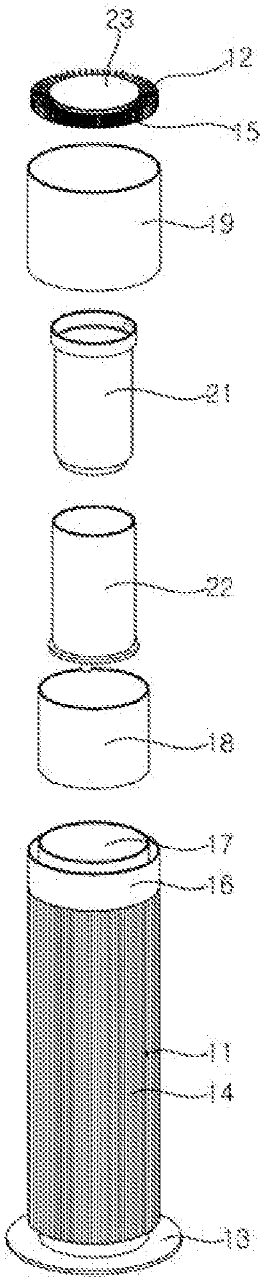
FIG. 2 is an exploded view of a humidifier according to an embodiment of the present disclosure.

Referring to FIG. 2, the humidifier 1 will be described.

FIG. 2 is an exploded view of the humidifier 1.

The humidifier 1 may include an intake grille 14. The intake grille 14 may be disposed around the circumference of the case 10. The intake grille 14 may form the intake opening 11. The intake grille 14 may be cylindrical.

The humidifier 1 may include a discharge grille 15. The discharge grille 15 may be disposed at an upper part of the case 10. The discharge grille 15 may form the discharge opening 12. The discharge grille 15 may be ring-shaped.

The humidifier 1 may include a first outer case 16. The first outer case 16 may be cylindrical. The intake grille 14 may be attached to and detached from the first outer case 16. The first outer case 16 may form the exterior of the case 10.

The humidifier 1 may include a first inner case 17. The first inner case 17 may be cylindrical. The first inner case 17 may be disposed radially inward from the first outer case 16. The first outer case 16 and the first inner case 17 may be radially spaced apart from each other The humidifier 1 may include a second outer case 19. The second outer case 19 may be cylindrical. The second outer case 19 may be disposed above the first outer case 16. The second outer case 19 may form the exterior of the case 10.

The humidifier 1 may include a second inner case 18. The second inner case 18 may be cylindrical. The second inner case 18 may be disposed above the first inner case 17. The second inner case 18 may be disposed radially inward from the second outer case 19. The second outer case 19 and the second inner case 18 may be radially spaced apart from each other.

The first outer case 16 and the second outer case 19 may be removably coupled together. Then again, the first outer case 16 and the second outer case 19 may be formed as a single body. The first outer case 16 and the second outer case 19 may be called “outer case”.

The first inner case 17 and the second inner case 18 may be removably coupled together. Then again, the first inner case 17 and the second inner case 18 may be formed into a single body. The first inner case 17 and the second inner case 18 may be called “inner case”.

The humidifier 1 may include a bucket 21. The bucket 21 may be cylindrical with an open top. The bucket 21 may internally have a space for storing water.

The humidifier 1 may include a bucket housing 22. The bucket housing 22 may surround the bucket 21. The bucket housing 22 may be cylindrical with an open top. The bucket 21 may be disposed inside the bucket housing 22.

The humidifier 1 may include a bucket cover 23. The bucket cover 23 may be disposed above the bucket 21. The bucket cover 23 may be removably attached to the discharge grille 15.

The water reservoir 20 may include the bucket 21, the bucket housing 22, and the bucket cover 23. The water reservoir 20 may be disposed inside the inner case 18. The water reservoir 20 and the inner case 18 may be radially spaced apart from each other.

Figure 3:
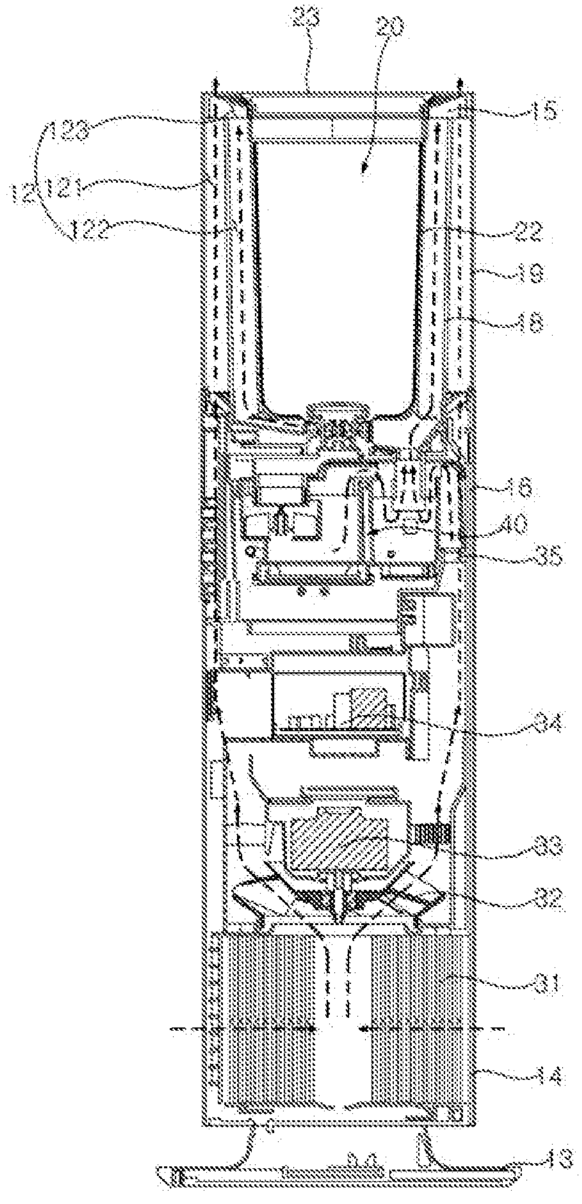
FIG. 3 is a cross-sectional view of a humidifier according to an embodiment of the present disclosure.

Referring to FIG. 3, the humidifier 1 will be described.

FIG. 3 is a vertical cross-sectional view of the humidifier 1.

The humidifier 1 may include a filter 31. The filter 31 may be disposed inside the intake grille 14. The filter 31 may be cylindrical.

The humidifier 1 may include a fan 32. The fan 32 may be disposed above the filter 31. The fan 32 may be disposed inside the intake grille 14.

The humidifier 1 may include a fan motor 33. The fan motor 33 may rotate the fan 32. The fan motor 33 may be disposed above the fan 32.

The humidifier 1 may include a controller 34. The controller 34 may be disposed inside the case 10. The controller 34 may be disposed between the fan motor 33 and a humidification assembly 40. The controller 34 may control the operation of the fan motor 33 and the humidification assembly 40. The controller 34 may include a plurality of PCB substrates.

The humidifier 1 may include an auxiliary fan 35. The auxiliary fan 35 may be disposed inside the case 10. The auxiliary fan 35 may be disposed at an entrance of the humidification assembly 40.

The humidifier 1 may include the humidification assembly 40. The humidification assembly 40 may be disposed inside the case 10. The humidification assembly 40 may be disposed between the water reservoir 20 and the fan 32. The humidification assembly 40 may cause water supplied from the water reservoir 20 to break up into tiny particles and deliver them to the discharge opening 12. Part of air blown by the fan 32 may enter the humidification assembly 40.

The discharge grille 15 may be disposed between the water reservoir 20 and the outer case 19. The inner case 18 may be disposed between the reservoir 20 and the outer case 19. The discharge grille 15 may be disposed above the inner case 18.

The discharge opening 12 may include a first discharge opening 121. The first discharge opening 121 may be formed between the outer case 19 and the inner case 18. The air blown by the fan 32 may flow upward through the first discharge opening 121. The first discharge opening 121 may extend in a ring shape. The first discharge opening 121 may be called "air flow path".

The discharge opening 12 may include a second discharge opening 122. The second discharge opening 122 may be formed between the inner case 18 and the water reservoir 20. Humidified air that has passed through the humidification assembly 40 may flow upward through the second discharge opening 122. The second discharge opening 122 may extend in a ring shape. The second discharge opening 122 may be called "humidification flow path".

The discharge opening 12 may include a mixing discharge opening 123. The mixing discharge opening 123 may be formed above the first discharge opening 121 and the second discharge opening 122. The mixing discharge opening 123 may be formed at the discharge grille 15. The mixing discharge opening 123 may extend in a ring shape. The mixing discharge opening 123 may be formed between the outer case 19 and the bucket cover 23. Air flowing in the first discharge opening 121 and air flowing in the second discharge opening 122 may be mixed together in the mixing discharge opening 123.

Conceptually, the discharge opening 12 may include the first discharge opening 121, the second discharge opening 122, and the mixing discharge opening 123. Then again, it may refer to a space open toward the outside of the case 10, separated from the above-mentioned components 121, 122, and 123. The discharge opening 12 may open toward the top of the case 10. The discharge opening 12 may be formed at the discharge grille 15. The discharge opening 12 may be formed to surround the water reservoir 20. The air blown by the fan 32 may flow through the discharge opening 12.

The air flow path 121 may be connected to the discharge opening 12. The humidification flow path 122 may be connected to the discharge opening 12. The air in the air flow path 121 and the air in the humidification flow path 122 may be mixed together in the discharge opening 12.

Air admitted into the case 10 through the intake grille 14 may pass through a filter 31 and be blown upward by the fan 32. Part of the air blown upward by the fan 32 may enter the humidification assembly 40, and the rest may flow upward through the first discharge opening 121. The air admitted to the humidification assembly 40, containing fine water drops, may flow upward through the second discharge opening 122. The air flowing through the first discharge opening 121 and the humidified air flowing through the second discharge opening 122 may be mixed together in the mixing discharge opening 123 and discharged upward of the humidifier 1.

Figure 4:
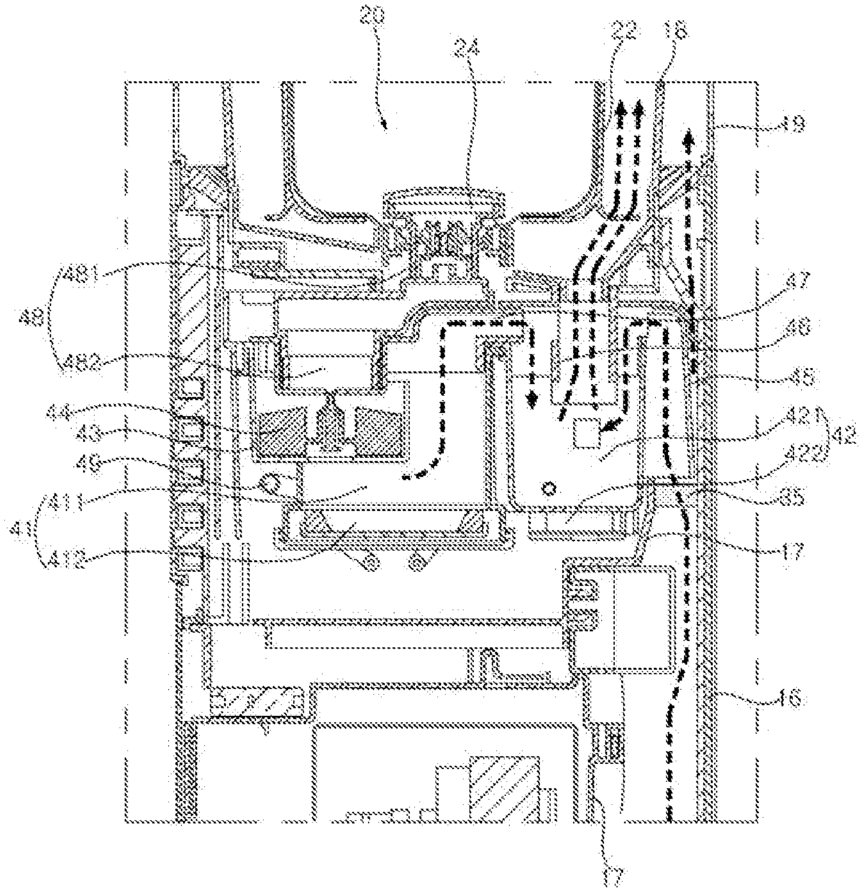
FIG. 4 is a partial cross-sectional view of a humidifier according to an embodiment of the present disclosure.

Referring to FIG. 4, the humidifier 1 will be described.

FIG. 4 is a partial vertical cross-sectional view of the humidifier 1.

The humidifier 1 may include the humidification assembly 40. The humidification assembly 40 may be disposed below the water reservoir 20. Humidified air produced in the humidification assembly 40 may be discharged upward.

The humidification assembly 40 may include a heating device 41. The heating device 41 may heat water and air admitted into it.

The heating device 41 may include a heating chamber 411. The heating chamber 411 may internally have a space. The water stored in the water reservoir 20 may be admitted to the heating chamber 411.

The heating device 41 may include a heater 412. The heater 412 may be attached to the bottom of the heating chamber 411. The heater 412 may apply heat into the heating chamber 411. The heater 412 may heat the water and air admitted into the heating chamber 411.

The humidification assembly 40 may include a humidification device 42. The humidification device 42 may convert the admitted water into fine water drops and discharge them upward.

The humidification assembly 42 may include a humidification chamber 421. The humidification chamber 421 may internally have a space. The water heated in the heating device 41 may be admitted to the humidification chamber 421.

The humidification device 42 may include a vibrating device 422. The vibrating device 422 may be attached to the bottom of the humidification chamber 421. The vibrating device 422 may generate vibrations by using ultrasonic waves. By the operation of the vibrating device 422, the water in the humidification chamber 421 may be converted into fine water drops. The humidification device 42 may work on the same principle as well-known ultrasonic humidifiers.

The humidification assembly 40 may include a valve housing 43. The valve housing 43 may be attached to the heating device 41. The valve housing 43 may be disposed within the heating chamber 411.

The humidification assembly 40 may include a valve 44. The valve 44 may be a floating valve. The valve 44 may be movably disposed inside the valve housing 43. The valve 44 may be moved upward and downward within the valve housing 43 and selectively supply water into the heating chamber 411.

The humidification assembly 40 may include an inlet 45. The inlet 45 may be connected to the humidification device 42. The inlet 45 may be connected to the inside of the humidification chamber 421. Part of the air blown by the fan 32 (see FIG. 3) may enter the humidification chamber 421 through the inlet 45. The auxiliary fan 35 may be attached to the inlet 45. The auxiliary fan 35 may draw air flowing between the outer case 16 and the inner case 17 into the inlet 45.

The humidification assembly 40 may include an outlet 46. The outlet 46 may be connected to the humidification device 42. The outlet 46 may protrude toward the inside of the humidification chamber 421. Fine water drops produced by the humidification device 42 may flow upward through the outlet 46.

The humidification assembly 40 may include a connector 47. The connector 47 may connect the heating device 41 and the humidification device 42. The connector 47 may connect the heating chamber 411 and the humidification chamber 421. The connector 47 may face the outlet 46.

The humidification assembly 40 may include a supply port 48. The supply port 48 may connect the water reservoir 20 and the heating device 41. The water in the water reservoir 20 may be admitted into the heating device 41 through the supply port 48.

The supply port 48 may include a first supply port 481. The first supply port 481 may be connected to the water reservoir 20. The first supply port 481 may be connected to the bottom of the bucket housing 22.

The water reservoir 20 may include a discharge port 24. The discharge port 24 may be disposed at the bottom of the water reservoir 20. The discharge port 24 may be connected to the first supply port 481.

The supply port 48 may include a second supply port 482. The second supply port 482 may connect the first supply port 481 and the valve housing 43. Water admitted into the first supply port 481 may be admitted into the valve housing 43 through the second supply port 482.

The humidification assembly 40 may include a connecting pipe 49. The connecting pipe 49 may connect the heating device 41 and the humidification device 42. The connecting pipe 49 may connect the heating chamber 411 and the humidification chamber 421. The water in the heating chamber 411 may be admitted into the humidification chamber 421 through the connecting pipe 49.

Part of the air flowing between the outer case 16 and the inner case 17 may be admitted to the humidification device 42 through the inlet 45. The air admitted to the humidification device 42, containing fine water drops produced within the humidification device 42, may flow upward through the outlet 46. The air flowing upward through the outlet 46 may flow upward between the water reservoir 20 and the inner case 18.

The water in the water reservoir 20 may be admitted into the valve housing 43 through the supply port 48. The water in the valve housing 43 may be admitted into the heating device 41 by movement of the valve 44. The water admitted into the heating device 41 may be heated by the heater 412. The water heated within the heating chamber 411 may be admitted into the humidification chamber 421 through the connecting pipe 49. The water admitted into the humidification chamber 421 may be converted into fine water drops by the vibrating device 422. The fine water drops, along with the air admitted through the inlet 45, may flow upward through the outlet 46.

Figure 5:
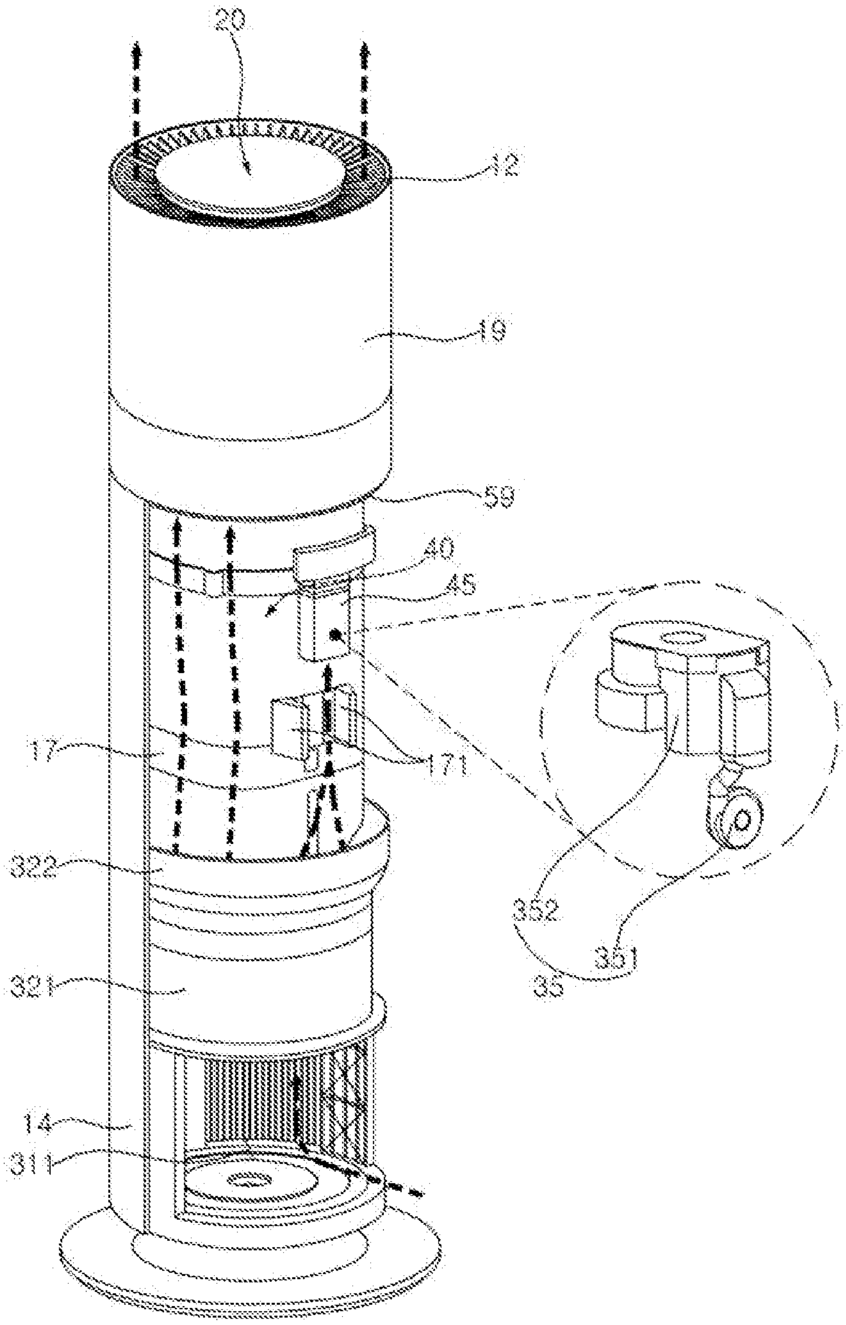
FIG. 5 shows part of a humidifier according to an embodiment of the present disclosure.

Referring to FIG. 5, the humidifier 1 will be described.

FIG. 5 illustrates a humidifier 1 from which the first outer case 16 is removed.

The humidifier 1 may include a filter mounting space 311. The filter mounting space 311 may be formed inside the intake grille 14. The filter 31 (see FIG. 3) may be disposed in the filter mounting space 311. The air admitted through the intake grille 14 may pass through the filter mounting space 311 and flow upward.

The humidifier 1 may include a fan housing 321. The fan 32 (see FIG. 3) may be disposed inside the fan housing 321. The fan housing 321 may be disposed above the filter 31 (see FIG. 3).

The humidifier 1 may include a housing top 322. The housing top 322 may form the top of the fan housing 321. The housing top 322 may be spaced radially outward from the inner case 17. The air blown by the fan 32 (see FIG. 3) may flow upward through a space formed between the inner case 17 and the housing top 322.

The humidifier 1 may include a flow guide 171. The flow guide 171 may protrude radially outward from the inner case 17. The flow guide 171 may be disposed between the inlet 45 and the fan housing 321. A plurality of flow guides 171 may be spaced apart from each other in a circumferential direction of the inner case 17. A space between the plurality of flow guides 171 may vertically face the inlet 45. A space between the plurality of flow guides 171 may vertically face the housing top 322.

The humidifier 1 may include an inner grille 59. The inner grille 59 may be disposed above the humidification assembly 40. The inner grille 59 may be disposed radially outward from the inner case 17. The inner grille 59 may be attached to the outer case 19.

Part of the air blown by the fan 43 (see FIG. 3) may enter the inlet 45. Part of the air blown by the fan 32 may enter the inlet 45 through the space between the plurality of flow guides 171. The air admitted to the humidification assembly 40 through the inlet 45, containing fine water drops, may be discharged through the discharge opening 12.

The auxiliary fan 35 may be disposed at the inlet 45. The auxiliary fan 35 may draw the air blown by the fan 32 (see FIG. 3) into the humidification assembly 40.

The auxiliary fan 35 may include a fan device 351. The fan device 351 may be a turbofan. The fan device 351 may be a sirocco fan.

The auxiliary fan 35 may include a supporter 352. The supporter 352 may be attached to the fan device 351. The supporter 352 may be fixed to the inlet 45. The supporter 352 may connect the fan device 351 and the inlet 45.

Part of the air blown by the fan 32 may flow upward through a space between the outer case 16 (see FIG. 3) and the inner case 17 and pass through the inner grille 59. The air that has passed through the inner grille 59 may flow upward and be discharged through the discharge opening 12.

Figure 6:
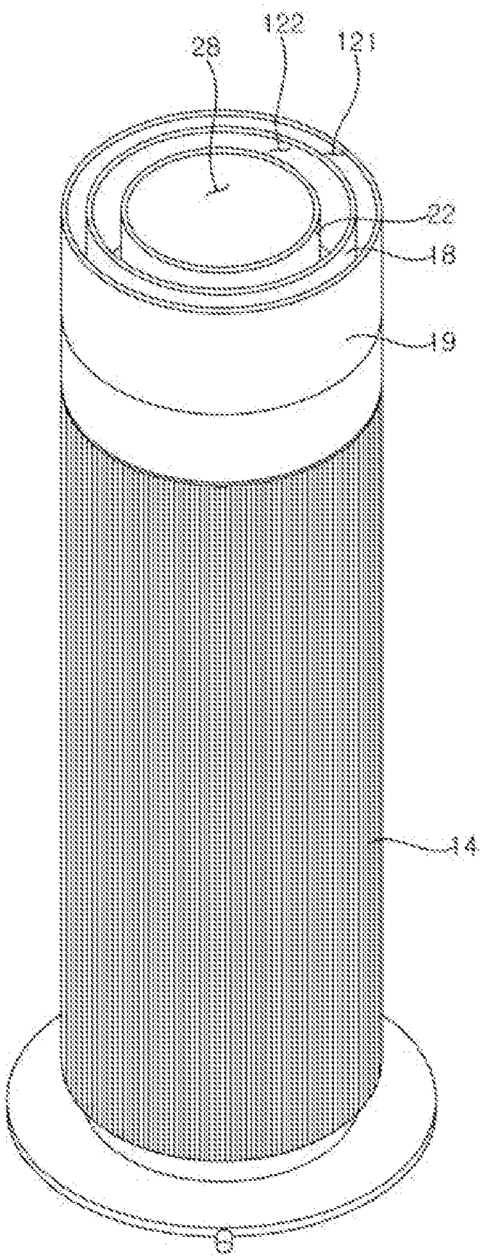
FIG. 6 is a partial cutaway perspective view of a humidifier according to an embodiment of the present disclosure.

Referring to FIG. 6, the humidifier 1 will be described.

FIG. 6 is a perspective view of the humidifier 1 with its top removed.

The humidification flow path 122 may be formed between the bucket housing 22 and the inner case 18. The humidified air produced in the humidification assembly 40 may flow upward along an outer wall of the bucket housing 22.

Part of the air admitted through the intake grille 14 may flow upward between the inner case 18 and the outer case 19. The air flow path 121 may be formed between the inner case 18 and the outer case 19.

The inner case 18 may divide the air blown flow path 121 and the humidification flow path 122.

The water reservoir 20 may have a storage space 28. The storage space 28 may be defined as an inner space of the bucket 21 (see FIG. 2).

The humidification flow path 122 may be positioned radially outward from the storage space 28. The humidification flow path 122 may be formed to surround the bucket housing 22.

The air flow path 121 may be positioned radially outward from the humidification flow path 122. The air flow path 121 may be formed to surround the inner case 18.

Figure 7:
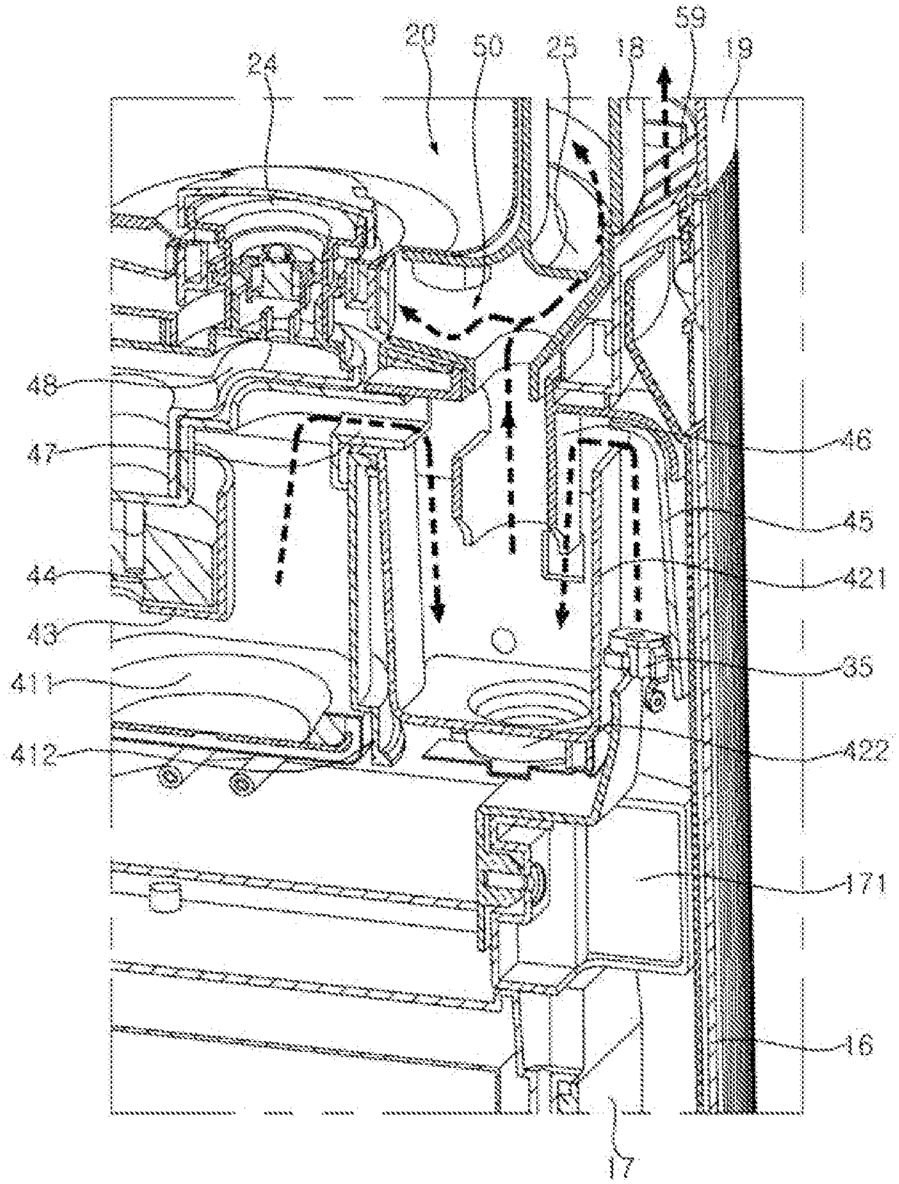
FIG. 7 is a partial cross-sectional view of a humidifier according to an embodiment of the present disclosure.

Referring to FIG. 7, the humidifier 1 will be described.

FIG. 7 is a vertical cutaway view of the humidifier 1 when viewed obliquely.

Part of air flowing upward between the outer case 16 and the inner case 17 may enter the inlet 45.

The auxiliary fan 35 may draw the air between the outer case 16 and the inner case 17 into the humidification device 42 through the inlet 45.

The flow guide 171 may vertically face the inlet 45. The flow guide 171 may be disposed below the auxiliary fan 35.

The air admitted into the humidification chamber 421 through the inlet 45 may be mixed with water drops produced by the operation of the vibration device 422. The humidified air mixed with the water drops may flow upward through the outlet 46.

The humidification chamber 421 may communicate with the heating chamber 411. The connector 47 may connect the humidification chamber 421 and the heating chamber 411.

Air in the heating chamber 411 may be mixed with the air admitted into the humidification chamber 421 and released to the outlet 46. Part of the water admitted into the heating chamber 411 may evaporate and enter the humidification chamber 421 in the form of vapor. The vapor produced in the heating chamber 411 may be mixed with the humidified air in the humidification chamber 421 and released to the outlet 46.

The air flowing upward from the humidification chamber 421 through the outlet 46 may be admitted between the water reservoir 20 and the inner case 18. The humidified air discharged through the outlet 46 may flow upward between the water reservoir 20 and the inner case 18.

The humidifier 1 may include a guide 50. The guide 50 may be connected to the outlet 46. The guide 50 may be disposed between the water reservoir 20 and the humidification assembly 40. The air flowing through the outlet 46 may flow upward from the guide 50.

The guide 50 may be vertically attached to the inner case 18. Then again, the guide 50 may be integral with the inner case 18.

The water reservoir 20 may include a guide rim 25. The guide rim 25 may extend along the circumference of the water reservoir 20. The guide rim 25 may be spaced upward from the outlet 46. The guide rim 25 may be spaced upward from the guide 50. The air flowing through the outlet 46 may be dispersed in a circumferential direction of the water reservoir 20 by the guide rim 25. The humidified air dispersed in the circumferential direction of the water reservoir 20 may flow upward between the water reservoir 20 and the inner case 18.

Part of the air flowing between the outer case 16 and the inner case 17 may flow upward through the inner grille 59. The inner grille 59 may be disposed between the outer case 19 and the inner case 18. The air that has passed through the inner grille 59 may flow upward between the outer case 19 and the inner case 18.

Figure 8:
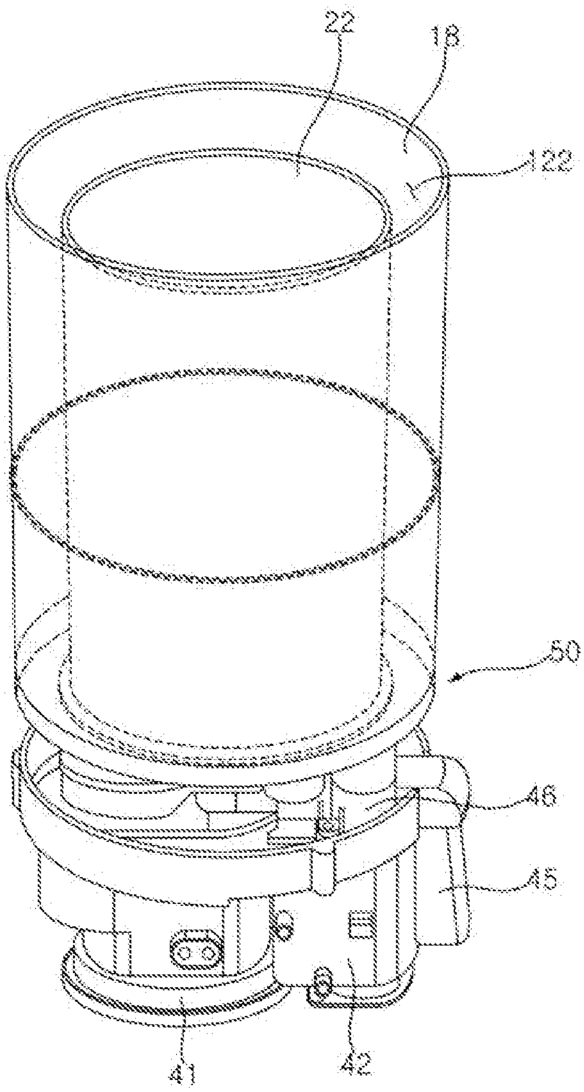
FIG. 8 shows part of a humidifier according to an embodiment of the present disclosure.

Referring to FIG. 8, the humidifier 1 will be described.

FIG. 8 is a separate view of part of the humidification assembly 40 and the water reservoir 20.

The humidifier 1 may include a guide 50. The guide 50 may be attached to the top of the humidification assembly 40. The guide 50 may be attached to the bottom of the water reservoir 20. The guide 50 may be attached to the bottom of the inner case 18. The guide 50 may connect the humidification assembly 40 and the humidification flow path 122. The guide 50 may connect the humidification assembly 40 and the water reservoir 20. The guide 50 may connect the humidification assembly 40 and the inner case 18.

Mist produced by the humidification device 42 may enter the guide through the outlet 46. The mist admitted to the guide 50 may flow upward through the humidification flow path 122.

The humidification flow path 122 may extend along the circumference of the inner case 18. The humidification flow path 122 may be ring-shaped. The guide 50 may extend along the circumference of the humidification flow path 122.

Figure 9:
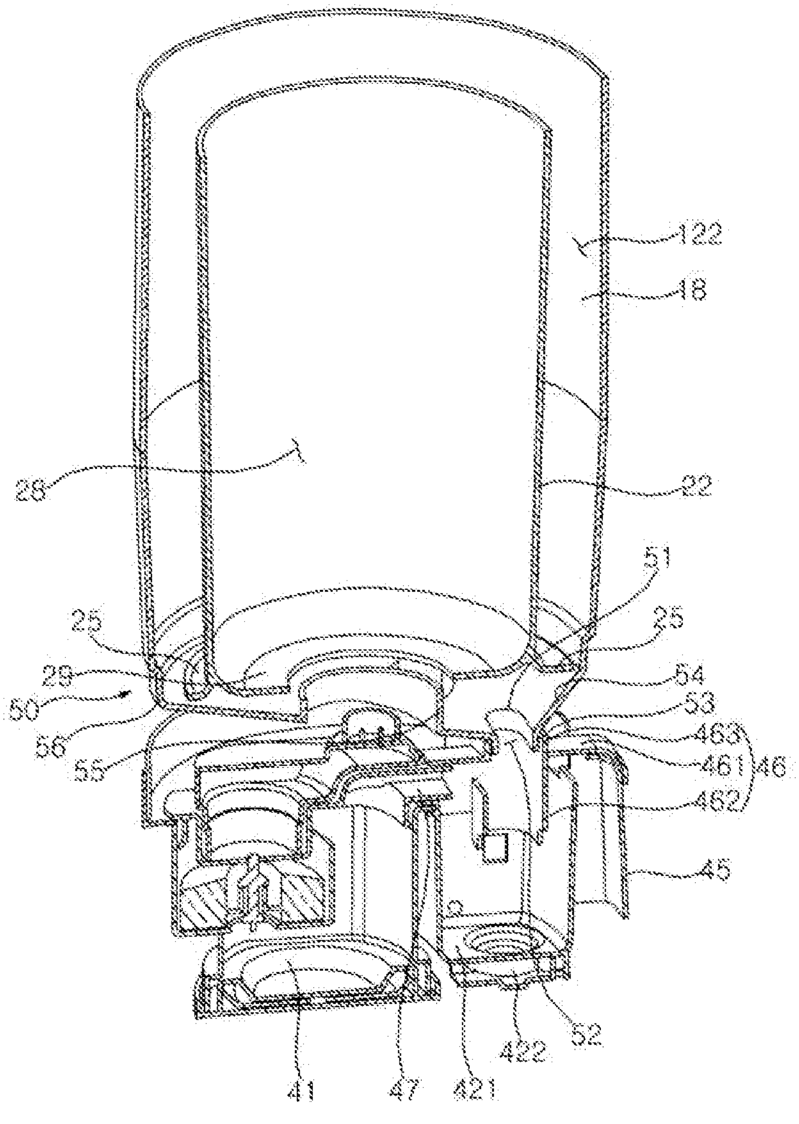
FIG. 9 is a partial cross-sectional view of a humidifier according to an embodiment of the present disclosure.
Figure 10:
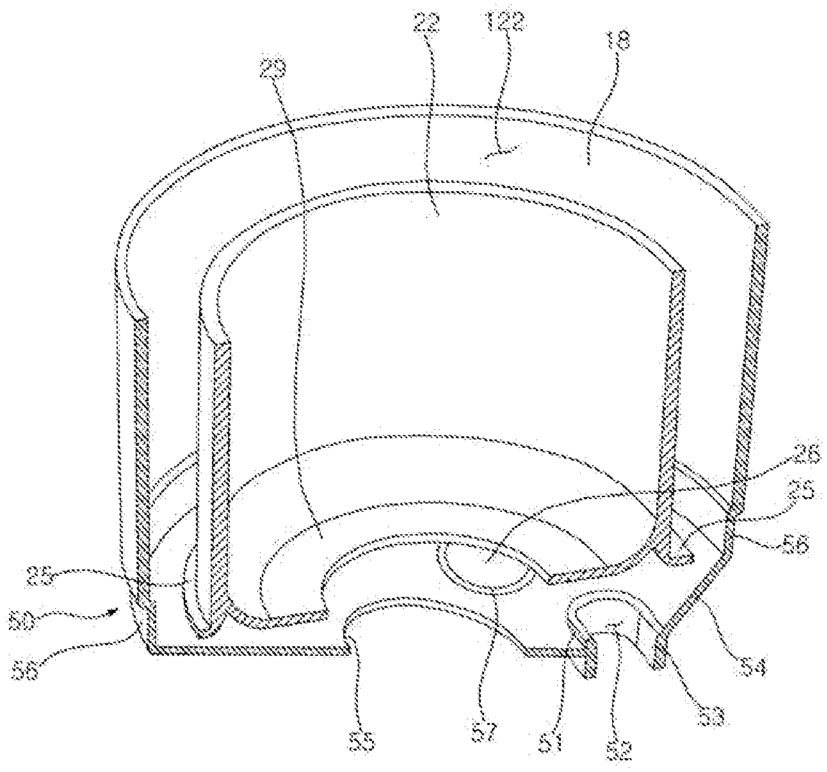
FIG. 10 is a partial cross-sectional view of a humidifier according to an embodiment of the present disclosure.

Referring to FIGS. 9 and 10, the humidifier 1 will be described.

FIG. 9 is a vertical cutaway cross-sectional view of the structure of FIG. 8. FIG. 10 is a cutaway view of the water reservoir 20, the inner case 18, and the guide 50.

The guide 50 may be disposed between the humidification assembly 40 and the water reservoir 20. The guide 50 may be disposed between the humidification assembly 40 and the inner case 18.

Air admitted to the humidification chamber 421 through the inlet 45 may be mixed with mist produced by the vibrating device 422. Air in the heating device 41 may enter the humidification chamber 421 through the connector 47 and be mixed with humidified air.

Mist produced in the humidification chamber 421 may flow upward through the outlet 46. The mist that has passed through the outlet 46 may flow between the guide 50 and the water reservoir 20.

The outlet 46 may include a chamber cover 461. The chamber cover 461 may be attached to the top of the humidification chamber 421. The chamber cover 461 may cover an internal space of the humidification chamber 421.

The outlet 46 may include a mist intake opening 462. The mist intake opening 462 may protrude from the chamber cover 461 into the humidification chamber 421. The mist in the humidification chamber 421 may flow upward through the mist intake opening 462.

The outlet 46 may include a mist discharge opening 463. The mist discharge opening 463 may protrude upward from the chamber cover 461. The mist admitted through the mist intake opening 462 may flow upward through the mist discharge opening 463. The mist discharge opening 463 may be spaced from the bottom of the water reservoir 20.

The water reservoir 20 may have a storage space 28. The storage space 28 may store water in it.

The water reservoir 20 may include a water reservoir lower wall 29. The water reservoir lower wall 29 may be disposed below the storage space 28. The water reservoir lower wall 29 may be spaced upward from the guide 50. The water reservoir lower wall 29 may be spaced upward from the humidification assembly 40.

The mist discharge opening 463 may be spaced downward from the water reservoir lower wall 29. The mist discharge opening 463 may vertically face the water reservoir lower wall 29.

The guide 50 may be attached to the mist discharge opening 463. The mist released through the mist discharge opening 463 may flow upward along the guide 50.

The guide 50 may have a downwardly projecting conical shape. The guide 50 may become wider toward the top.

The guide 50 may include a guide intake portion 51. The guide intake portion 51 may be formed in the bottom of the guide 50. The guide intake portion 51 may be spaced from the bottom of the water reservoir lower wall 29. The mist discharge opening 463 may be connected to the guide intake portion 51. The mist in the mist discharge opening 463 may flow upward through the guide intake portion 51.

The guide 50 may include a guide intake hole 52. The guide intake hole 52 may be vertically open. The guide intake hole 52 may be connected to the mist discharge opening 463. The guide intake hole 52 may be formed through the guide intake portion 51. The guide intake hole 52 may vertically face the water reservoir lower wall 29.

The guide 50 may include a discharge opening coupling portion 53. The discharge opening coupling portion 53 may protrude downward from the guide intake portion 51. The discharge opening coupling portion 53 may be coupled to the mist discharge opening 463. The discharge opening coupling portion 53 may be inserted into the mist discharge opening 53.

The guide 50 may include a guide wall 54. The guide wall 54 may extend radially from the guide intake portion 51. The guide wall 54 may extend slantingly upward. The guide wall 54 may form a peripheral wall of the conical guide 50. The guide wall 54 may be spaced downward from the water reservoir 20. The guide wall 54 may be disposed below the inner case 18.

The guide 50 may include a port insertion portion 55. The port insertion portion 55 may be formed in the center of the guide wall 54. The port insertion portion 55 may be vertically open. The port insertion portion 55 may be positioned radially inward from the guide intake portion 51. A water supply port (not shown) of the water reservoir 20 may penetrate through the port insertion portion 55 and extend downward. The supply port 48 of the humidification assembly 40 may penetrate through the port insertion portion 55 and be connected to the water reservoir 20. The port insertion portion 55 may protrude upward from the guide wall 54, and may be vertically formed through the guide wall 54.

The guide 50 may include a guide side wall 56. The guide side wall 56 may protrude upward form the guide wall 54. The guide side wall 56 may extend along the circumference of the guide 50. The guide side wall 56 may protrude upward from a radially outer end of the guide wall 54. The guide side wall 56 may be attached to the inner case 18. The inner case 18 may be disposed above the guide side wall 56.

The guide 50 may include a protrusion insertion portion 57. The protrusion insertion portion 57 may be vertically formed through the guide wall 54. The protrusion insertion portion 57 may be positioned radially outward from the port insertion portion 55.

The water reservoir 20 may include a coupling protrusion 26. The coupling protrusion 26 may protrude downward from the water reservoir lower wall 29. The coupling protrusion 26 may be inserted into and fixed to the protrusion insertion portion 57.

The water reservoir 20 may include a guide rim 25. The guide rim 25 may protrude radially outward from the bucket housing 22. The guide rim 25 may extend along the circumference of the water reservoir 20. The guide rim 25 may be spaced upward from the mist discharge opening 463. The guide rim 25 may be spaced upward from the guide wall 54. The guide rim 25 may be spaced from the guide side wall 56. A space may be formed between the guide rim 25 and the guide side wall 56.

The humidification flow path 122 may be formed between the bucket housing 22 and the inner case 18. The humidification flow path 122 may be formed above the guide 50.

The mist released through the mist discharge opening 463 may enter the humidification flow path 122. The mist released through the mist discharge opening 463 may flow upward along the guide wall 54. The mist released through the mist discharge opening 463 may hit the water reservoir lower wall 29. The mist released through the mist discharge opening 463 may hit the guide rim 25. The mist released through the mist discharge opening 463 may enter the humidification flow path 122 through the space between the guide rim 25 and the guide side wall 56.

Figure 11:
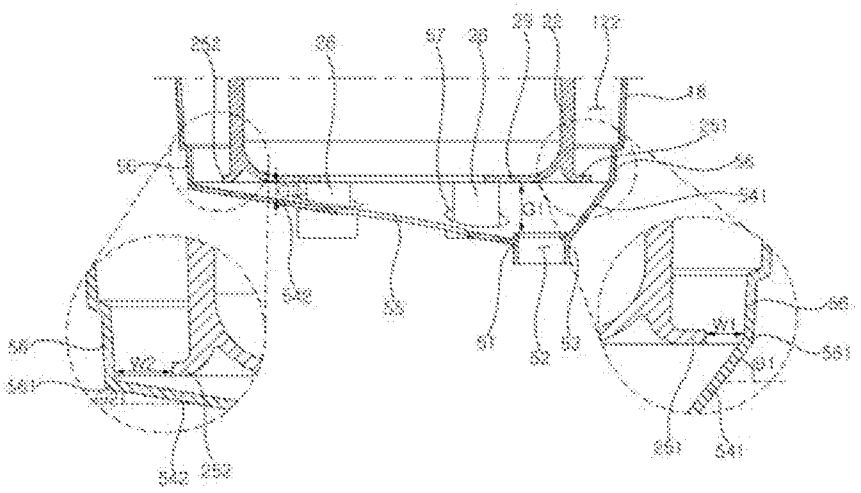
FIG. 11 is a partial cross-sectional view of a humidifier according to an embodiment of the present disclosure.
Figure 12:
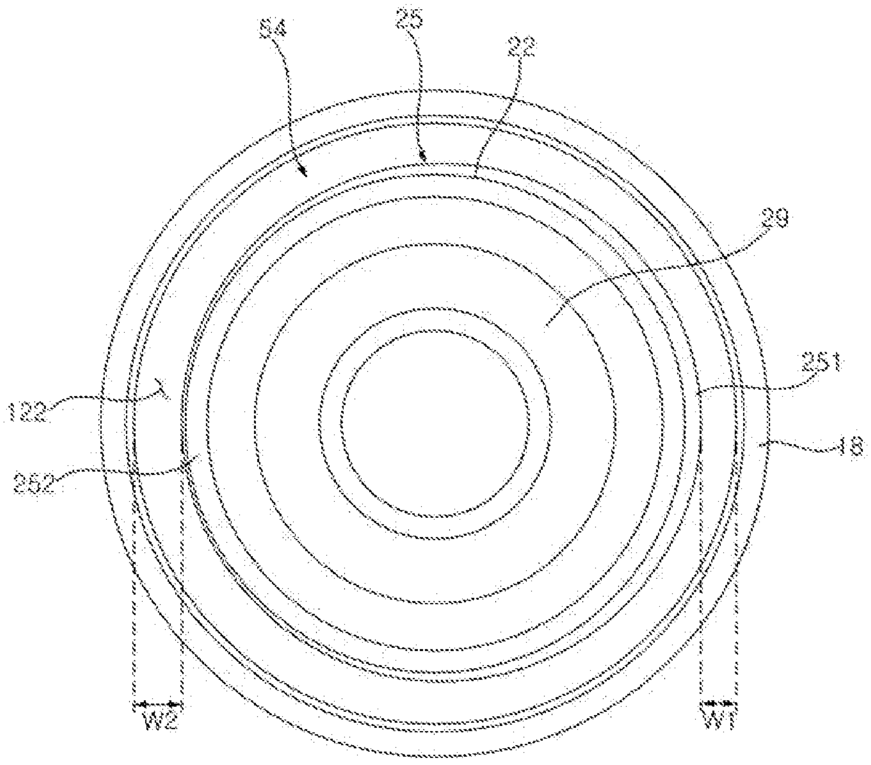
FIG. 12 is a partial top view of a humidifier according to an embodiment of the present disclosure.

Referring to FIGS. 11 and 12, the humidifier 1 will be described.

FIG. 11 is a vertical cutaway cross-sectional view of the guide 50, the water reservoir 20, and the inner case 18 attached together. FIG. 12 is a view of the guide 50, the water reservoir 20, and the inner case 18 attached together, when viewed from above.

The guide 50 may be shaped in such a way that the guide intake portion 51 is in the lowermost position. The guide intake portion 51 may be positioned lower than the guide wall 54. The guide intake portion 51 may be positioned lower than the guide side wall 56. The guide wall 54 may extend slantingly upward from the guide intake portion 51.

The guide intake portion 51 may be positioned radially outward from the center of the guide 50. The guide intake portion 51 may be spaced from the center of the guide 50. The humidification flow path 122 may have a cylindrical shape that surrounds the center of the guide 50. As such, mist admitted through the guide intake hole 52 may be supplied mostly to a certain region of the humidification flow path 122.

The guide wall 54 may extend radially from the guide intake portion 51. The guide wall 54 may become closer to the water reservoir lower wall 29 as it becomes farther away from the guide intake portion 51. The guide wall 54 may extend upward away from the guide intake portion 51.

The distance G1 between the guide wall 54 and the water reservoir lower wall 29 measured at the guide intake portion 51 may be greater than the distance G2 between the guide wall 54 and the water reservoir lower wall 29 measured at a point away from the guide intake portion 51.

The guide wall 54 may include a first guide portion 541. The first guide portion 541 may be a portion of the guide wall 54. The first guide portion 541 may be a portion of the guide wall 54 that is positioned in a direction away from the center of the guide 50 with respect to the guide intake portion 51. The first guide portion 541 may extend slantingly upward from the guide intake portion 51. The first guide portion 541 may extend in a direction away from the center of the guide 50.

The guide wall 54 may include a second guide portion 542. The second guide portion 542 may be a portion of the guide wall 54. The second guide portion 542 may be a portion of the guide wall 54 that is positioned in a direction toward the center of the guide 50 with respect to the guide intake portion 542. The second guide portion 542 may extend slantingly upward from the guide intake portion 51. The second guide portion 542 may extend toward the center of the guide 50 from the guide intake portion 51.

The guide 50 may be centered at the second guide portion 542. The port insertion portion 55 may be formed in the second guide portion 542.

The guide rim 25 may include a first rim portion 251. The first rim portion 251 may be a portion of the guide rim 25. The first rim portion 251 may be a portion of the guide rim 25 that is positioned in a direction away from the center of the guide 50 with respect to the guide intake portion 51. The first rim portion 251 may be spaced upward from the first guide portion 541.

The guide rim 25 may include a second rim portion 252. The second rim portion 252 may be a portion of the guide rim 25. The second rim portion 252 may be a portion of the guide rim 25 that is positioned in a direction toward the center of the guide 50 with respect to the guide intake portion 51. The second rim portion 252 may be spaced upward from the second guide portion 542.

The first guide portion 541 may have an upward angle θ1 of inclination with respect to the horizontal. The guide side wall 56 may extend upward from an end of the first guide portion 541.

The second guide portion 542 may have an upward angle θ2 of inclination with respect to the horizontal. The guide side wall 56 may extend upward from an end of the second guide portion 542

The angle θ1 of inclination of the first guide 541 may be larger than the angle θ2 of inclination of the second guide portion 542.

The guide 50 may include an edge 561. The edge 561 may be formed at a region where the guide the guide wall 54 and the guide side wall 56 are joined together.

The first rim portion 251 may be spaced upward from the first guide portion 541. The first rim portion 251 may horizontally face the guide side wall 56. The first rim portion 251 may face the edge 561. The first rim portion 251 may be horizontally spaced from the edge 561. There may be a distance W1 between the first rim portion 251 and the edge 561.

The second rim portion 252 may be spaced upward from the second guide portion 542. The second rim portion 252 may horizontally face the guide side wall 56. The second rim portion 252 may face the edge 561. The second rim portion 252 may be horizontally spaced from the edge 561. There may be a distance W2 between the second rim portion 252 and the edge 561.

The distance W1 between the first rim portion 251 and the edge 561 may be smaller than the distance W2 between the second rim portion 252 and the edge 561.

The distance between the guide rim 25 and the guide side wall 56 may become larger away from the guide intake portion 51.

The mist produced in the humidification assembly 40 may flow upward through the guide intake hole 52. The mist admitted between the guide 50 and the water reservoir lower wall 29 may flow upward along the guide wall 54. The mist flowing upward along the guide wall 54 may enter the humidification flow path 122 through the space between the guide rim 25 and the guide side wall 56.

Hereupon, due to the above-described structure of the guide 50 and the guide rim 25, the mist may be diffusedly evenly along the circumference of the humidification flow path 122. That is, the above-described structure of the guide 50 and the guide rim 25 helps to prevent the mist from being concentrated in a particular region of the humidification flow path 122.

Moreover, the above-described structure of the guide 50 and the guide rim 25 allows water drops formed on the humidification flow path 122 to move along the guide wall 54 and collect in the guide intake portion 51. The water collected in the guide intake portion 51 may collect in the humidification chamber 421 through the guide intake hole 52.

Figure 13:
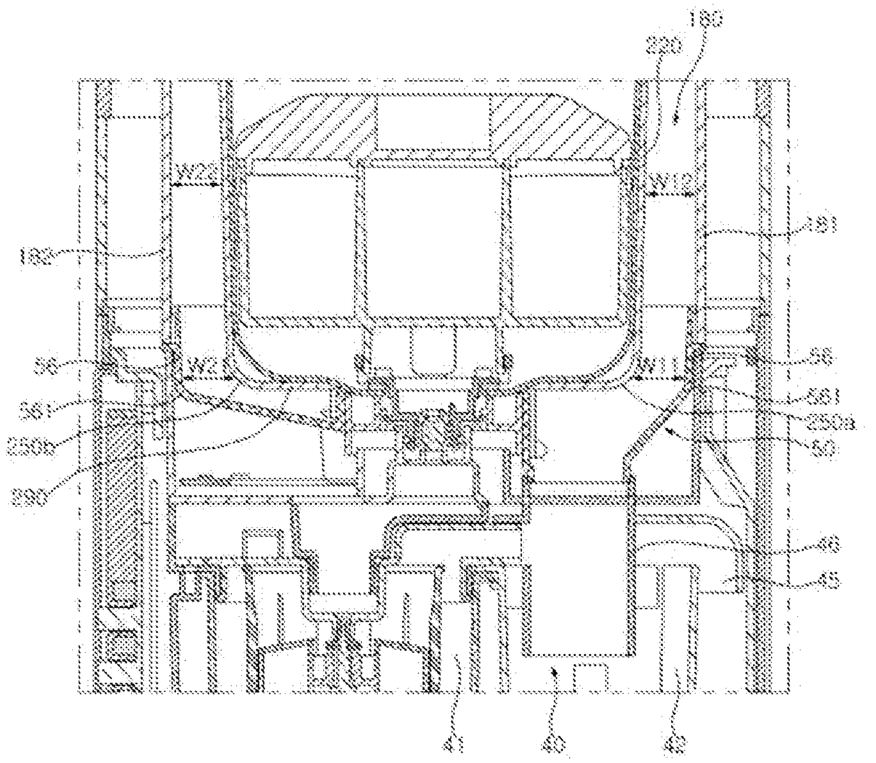
FIG. 13 is a partial cross-sectional view of a humidifier according to an embodiment of the present disclosure.

Referring to FIG. 13, the humidifier 1 will be described.

FIG. 13 is a partial cross-sectional view of a humidifier with a water reservoir according to another embodiment of the present disclosure.

In the embodiment illustrated in FIG. 13, the guide rim 25 may not be provided, unlike in FIGS. 1 to 12.

The description given with reference to FIGS. 1 to 12 may apply equally to the humidification assembly 40 and the guide 50 in FIG. 13.

The air admitted to the humidification device 42 through the inlet 45 may be discharged in the form of mist to the outlet 46. The mist discharged to the outlet 46 may flow along the guide wall 54.

The bucket housing 220 may include a first water reservoir edge portion 250*a*. The first water reservoir edge portion 250*a* may be a peripheral wall of the water reservoir lower wall 290 that is positioned in a direction away from the center of the guide 50 with respect to the outlet 46.

The bucket housing 220 may include a second water reservoir edge portion 250*b*. The second water reservoir edge portion 250*b* may be a peripheral wall of the water reservoir lower wall 290 that is positioned in a direction toward the center of the guide 50 with respect to the outlet 46.

The first water reservoir edge portion 250*a* may face the edge 561 of the guide 50. The second water reservoir edge portion 250*b* may face the edge 561 of the guide 50.

The first water reservoir edge portion 250*a* may be spaced from the guide side wall 56. There may be a distance W11 between the first water reservoir edge portion 250*a* and the guide side wall 56.

The second water reservoir edge portion 250*b* may be spaced from the guide side wall 56. There may be a distance W21 between the second water reservoir edge portion 250*b* and the guide side wall 56.

The distance W11 between the first water reservoir edge portion 250*a* and the guide side wall 56 may be smaller than the distance W21 between the second water reservoir edge portion 250*b* and the guide side wall 56.

The distance between the water reservoir lower wall 290 and the guide side wall 56 may become larger away from the outlet 46.

The inner case 180 may include a first case portion 181. The first case portion 181 may be a portion of the inner case 180 that is positioned in a direction away from the center of the guide 50 with respect to the outlet 46.

The inner case 180 may include a second case portion 182. The second case portion 182 may be a portion of the inner case 180 that is positioned in a direction toward the center of the guide 50 with respect to the outlet 46.

The first case portion 181 may be positioned above the first water reservoir edge portion 250*a*. The second case portion 182 may be positioned above the second water reservoir edge portion 250*b*.

The distance W12 between the first case portion 181 and the bucket housing 220 may be smaller than the distance W22 between the second case portion 182 and the bucket housing 220.

In the embodiment of FIG. 13, the mist discharged through the outlet 46 may be distributed uniformly throughout the humidification flow path 122 by adjusting the shape of the bucket housing 220 and the distance between the bucket housing 220 and the inner case 180.

Figure 14:
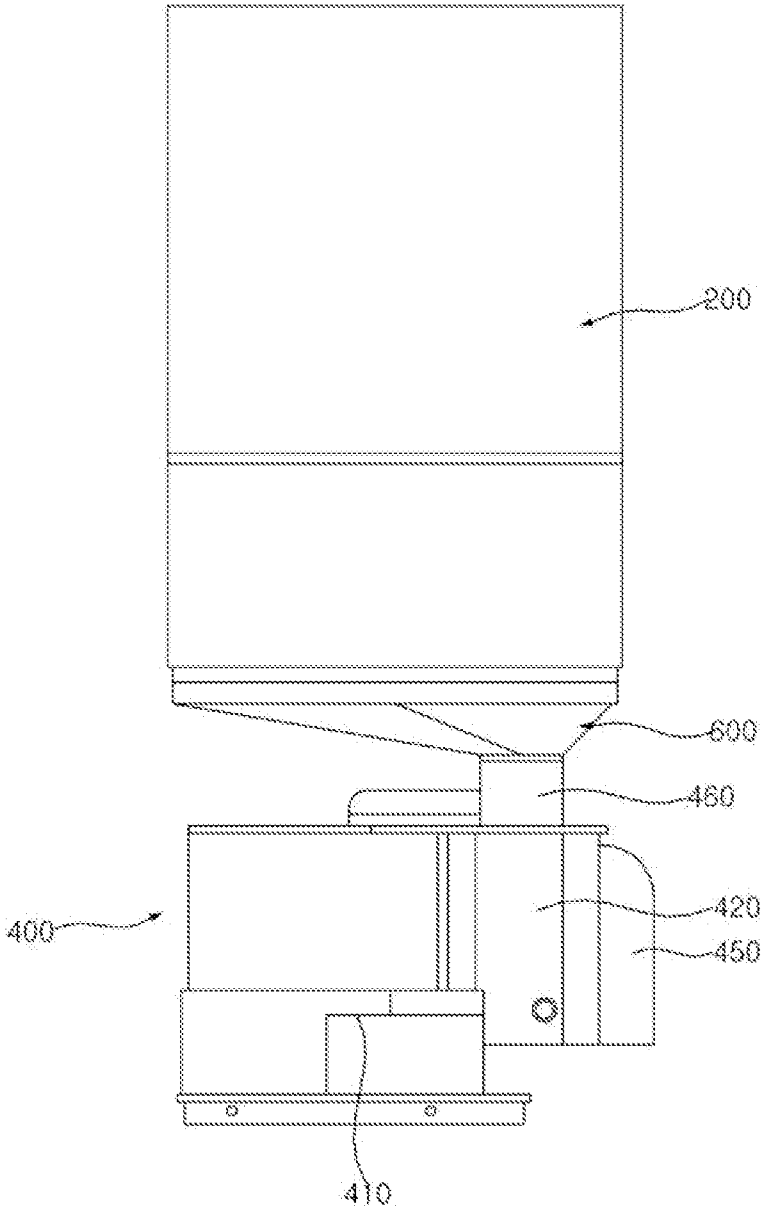
FIG. 14 shows part of a humidifier according to an embodiment of the present disclosure.

Referring to FIG. 14, the humidifier 1 will be described.

FIG. 14 is a separate view of the water reservoir 200, the humidification assembly 400, and the guide 600 according to another embodiment of the present disclosure.

The humidification assembly 400 may include a heating device 410, a humidification device 420, an inlet 450, and an outlet 460. The description of the humidification assembly 40 given with reference to FIGS. 1 to 12 may apply equally to the humidification assembly 400.

The guide 600 may connect the water reservoir 200 and the humidification assembly 400. The mist discharged through the outlet 460 may be discharged upward through the guide 600. The mist discharged through the guide 600 may flow to the humidification flow path which is formed along the circumference of the water reservoir 200.

Figure 15:
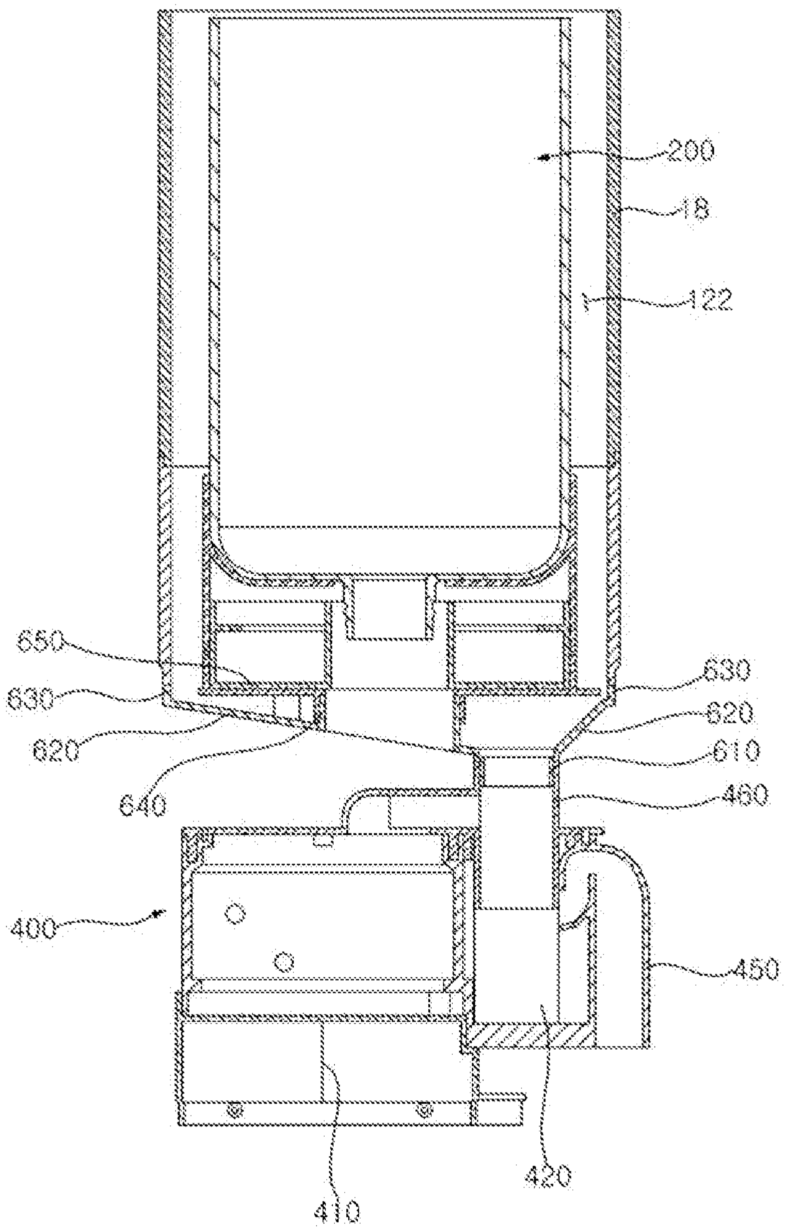
FIG. 15 is a partial cross-sectional view of a humidifier according to an embodiment of the present disclosure.

Referring to FIG. 15, the humidifier 1 will be described.

FIG. 15 is a vertical cutaway cross-sectional view of the structure illustrated in FIG. 14.

The guide 600 may have a downwardly projecting conical shape. The water reservoir 200 may be attached to the top of the guide 600. The inner case 18 may be attached to the top of the guide 600.

The guide 600 may include a guide intake portion 610. The guide intake portion 610 may be attached to the outlet 460. Mist produced by the humidification device 420 may enter the guide intake portion 610 through the outlet 460.

The guide intake portion 610 may include a guide wall 620. The guide wall 620 may extend radially from the guide intake portion 610. The guide wall 620 may extend slantingly upward from the guide intake portion 610. The guide wall 620 may form a peripheral wall of the conical guide 600. The guide 600 may have a space surrounded by the guide wall 620.

The guide 600 may include a guide side wall 630. The guide side wall 630 may extend upward from the guide wall 620. The guide side wall 630 may be attached to the inner case 18.

The guide 600 may include a port insertion portion 640. The port insertion portion 640 may be vertically formed through the guide wall 620. The port insertion portion 640 may be positioned closer to the center of the guide 600 than the guide intake portion 610.

The guide 600 may include a coupling body 650. The coupling body 650 may be spaced upward from the guide wall 620. The coupling body 650 may vertically face the guide intake portion 610. The coupling body 650 may be spaced inward from the guide side wall 630. The mist discharged through the outlet 460 may hit the coupling body 650.

The water reservoir 200 may be fitted to the coupling body 650. The water reservoir 200 may be mounted over the coupling body 650. The water reservoir 200 may be removed from the coupling body 650.

Figure 16:
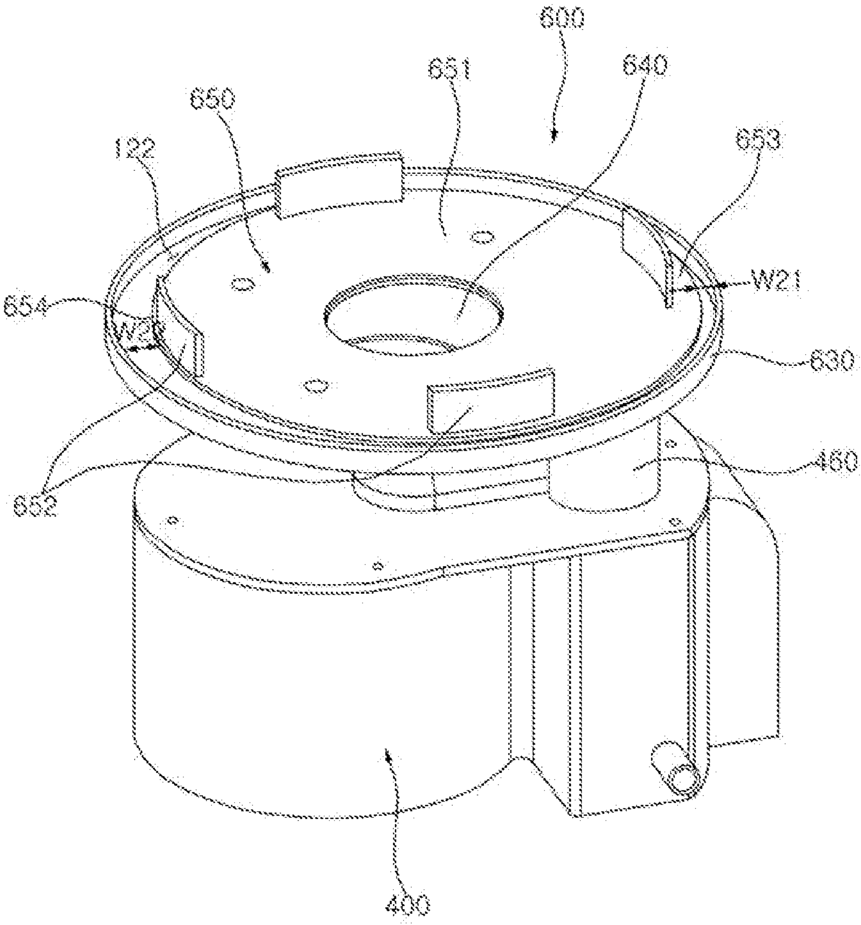
FIG. 16 is a partial perspective view of a humidifier according to an embodiment of the present disclosure.
Figure 17:
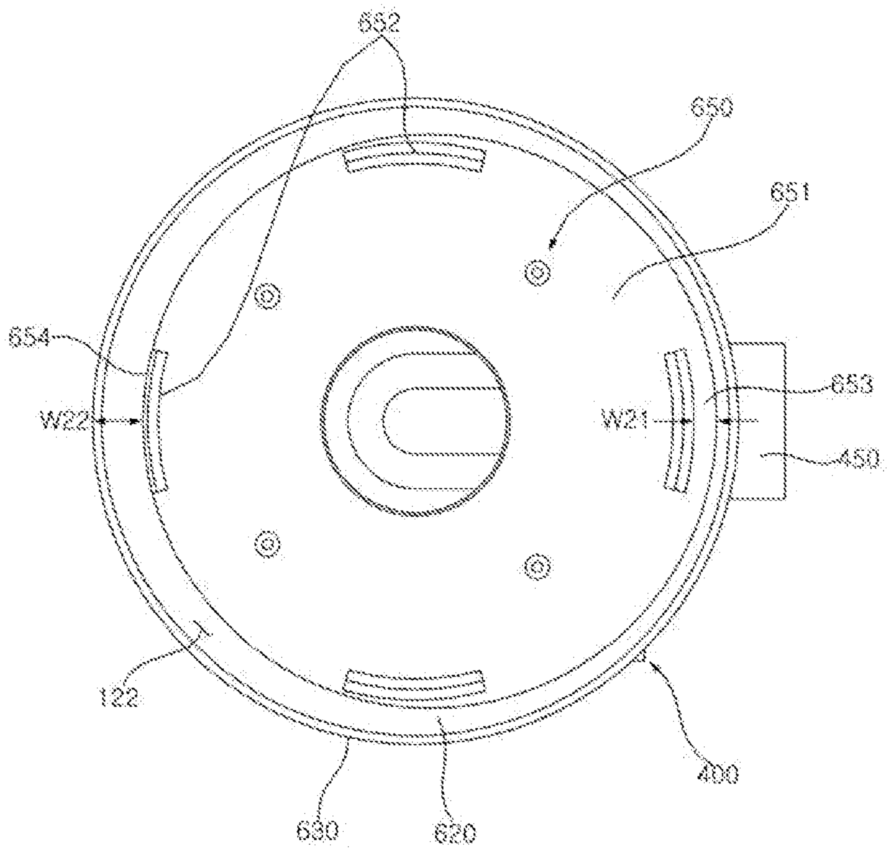
FIG. 17 is a partial top view of a humidifier according to an embodiment of the present disclosure.

Referring to FIGS. 16 and 17, the humidifier 1 will be described.

FIG. 16 is a separate view of the humidification assembly 400 and the guide 600 according to another embodiment of the present disclosure. FIG. 17 illustrates the structure of FIG. 16 when viewed from above.

The coupling body 650 may include a coupling plate 651. The coupling plate 651 may be disc-shaped. The coupling plate 651 may be spaced inward from the guide side wall 630. The water reservoir 200 may be mounted over the coupling plate 651.

The coupling body 650 may include a support rib 652. The support rib 652 may protrude upward from the coupling plate 651. A plurality of support ribs 652 may be formed at intervals around the circumference of the coupling plate 651. The water reservoir 200 may be disposed inward from the plurality of support ribs 652. The support ribs 652 may be configured to surround the water reservoir 200, and may support the water reservoir 200.

The coupling body 650 may include a first edge portion 653. The first edge portion 653 may be a portion of the coupling plate 651. The first edge portion 653 may be a portion of the coupling plate 651 that is positioned in a direction away from the center of the guide 600 with respect to the outlet 460. The first edge portion 653 may be positioned radially outward from the support ribs 652.

The coupling body 650 may include a second edge portion 654. The second edge portion 654 may be a portion of the coupling plate 651. The second edge portion 654 may be a portion of the coupling plate 651 that is positioned in a direction toward the center of the guide 600 with respect to the outlet 460. The second edge portion 654 may be positioned radially outward from the support ribs 652.

The coupling body 650 may be spaced inward from the guide side wall 630. The mist discharged through the outlet 460 may flow to a space between the coupling body 650 and the guide side wall 630.

The humidification flow path 122 may be formed between the guide side wall 630 and the coupling plate 650. The humidification flow path 122 may be formed in a ring shape.

The distance W21 between the first edge portion 653 and the guide side wall 630 may be smaller than the distance W22 between the second edge portion 654 and the guide side wall 630.

The width of the humidification flow path 122 may become larger away from the outlet 460. The mist discharged through the outlet 460 may flow upward along the guide wall 620. The mist flowing along the guide wall 620 may flow upward through the humidification flow path 122.

Figure 18:
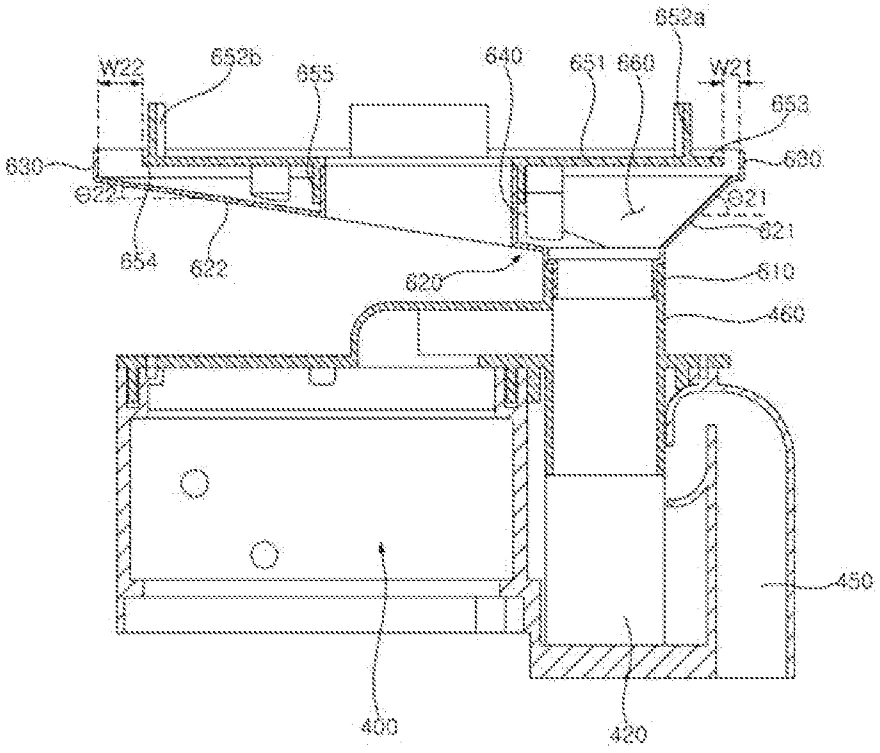
FIG. 18 is a partial cross-sectional view of a humidifier according to an embodiment of the present disclosure.

Referring to FIG. 18, the humidifier 1 will be described. FIG. 18 is a vertical cross-sectional view of the structure illustrated in FIG. 16.

The guide wall 620 may include a first guide portion 621. The first guide portion 621 may be a portion of the guide wall 620 that is positioned in a direction away from the center of the guide 600 with respect to the guide intake portion 610.

The guide wall 620 may include a second guide portion 622. The second guide portion 622 may be a portion of the guide wall 620 that is positioned in a direction toward the center of the guide 600 with respect to the guide intake portion 610.

The guide wall 620 may slope upward from the guide intake portion 610. The guide wall 620 may extend radially.

The angle θ21 of inclination of the first guide portion 621 with respect to the horizontal may be larger than the angle θ22 of inclination of the second guide portion 622 with respect to the horizontal.

The support ribs 652 may include a first support rib 652*a*. The support ribs 652 may include a second support rib 652*b*. The first sub rib 652*a* may be located adjacent to the guide intake portion 610 than the second support rib 652*b*.

The first edge portion 653 may be positioned radially outward from the first support rib 652*a*. The second edge portion 654 may be positioned radially outward from the second support rib 652*b*.

The distance W21 between the first edge portion 653 and the guide side wall 630 may be smaller than the distance W22 between the second edge portion 654 and the guide side wall 630.

The coupling body 650 may include a body fixing portion 655. The body fixing portion 655 may protrude downward from the coupling plate 651. The body fixing portion 655 may be inserted into and fixed to the port insertion portion 640.

The guide 600 may include a distribution space 660. The distribution space 660 may be surrounded by the guide wall 620. The distribution space 660 may be surrounded by the guide side wall 630. The distribution space 660 may be formed between the guide intake portion 610 and the coupling body 650.

The mist discharged through the outlet 460 may be admitted to the distribution space 660. The mist discharged through the distribution space 660 may flow upward through the humidification flow path 122 formed between the coupling body 650 and the guide side wall 630. Hereupon, due to the above-described structure, mist may be distributed evenly around the circumference of the humidification flow path 122. Also, the sloping structure of the guide wall 620 may facilitate the collection of water drops formed on the humidification flow path 122 in the humidification assembly 400.

It will be apparent that, although the exemplary embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure The present disclosure may be embodied in various modifications, and its scope of rights is not limited by the foregoing embodiments. Thus, the modifications should be construed as falling within the scope of this disclosure as long as they include components as claimed in the claims of this disclosure.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A humidifier comprising:

a case with an intake opening;

a discharge opening that opens toward an outside of the case;

a fan disposed inside the case;

a humidification assembly including a humidification chamber where mist is produced, and an outlet through which the mist produced in the humidification chamber flows;

a humidification flow path to which mist released through the outlet is admitted, and which extends from a top of the outlet and connects to the discharge opening; and a guide disposed between the outlet and the humidification flow path and including a guide wall that slopes upward toward the humidification flow path from the outlet, wherein the outlet is connected to the guide at a position spaced apart from a center of the guide, wherein the guide wall includes:

a first guide portion positioned in a direction opposite to the center of the guide with respect to the outlet; and a second guide portion positioned opposite to the first guide portion with respect to the outlet and in which the center of the guide is located, and wherein an angle of inclination of the first guide portion is greater than an angle of inclination of the second guide portion.

2. The humidifier of claim 1, wherein the guide projects in a direction away from the humidification flow path, and the outlet is connected to a bottom of the guide.

3. The humidifier of claim 1, wherein the guide includes:

a guide intake portion connecting the outlet and the guide wall; and a guide intake hole formed through the guide intake portion, and that communicates with an inside of the humidification chamber.

4. The humidifier of claim 1, wherein the guide includes a guide side wall that extends upward from the guide wall and is positioned radially outward from the humidification flow path.

5. The humidifier of claim 1, wherein the guide has a downwardly projecting conical shape, and has a space surrounded by the guide wall.

6. The humidifier of claim 1, further comprising:

a water reservoir that supplies water to the humidification assembly, and is spaced upward from the outlet; and an inner case spaced radially outward form the water reservoir, between which and the water reservoir the humidification flow path is formed, wherein the guide is disposed between the water reservoir and the humidification assembly and attached to the inner case.

7. The humidifier of claim 1, further comprising a water reservoir that supplies water to the humidification assembly, and is spaced upward from the outlet, wherein the water reservoir includes a water reservoir lower wall vertically facing the outlet, and the humidification flow path is formed radially outward from the water reservoir lower wall.

8. The humidifier of claim 1, wherein the outlet is attached to the guide at a position spaced from the center of the guide.

9. The humidifier of claim 1, further comprising a water reservoir that supplies water to the humidification assembly, and is spaced upward from the outlet, wherein the guide includes a coupling body spaced upward from the outlet, and over which the water reservoir is mounted.

10. The humidifier of claim 9, wherein the guide includes:

a coupling plate where the water reservoir is mounted; and a support rib protruding upward from the coupling plate.

11. The humidifier of claim 9, wherein the guide includes a guide side wall protruding upward from the guide wall and spaced radially outward from the coupling body, wherein the humidification flow path is formed between the guide side wall and the coupling body.

12. The humidifier of claim 11, wherein the outlet is connected to the guide at a position spaced from a center of the guide, and a width of the humidification flow path becomes smaller toward the outlet.

13. A humidifier comprising:

a case with an intake opening;

a discharge opening that opens toward an outside of the case;

a fan disposed inside the case;

a humidification assembly including a humidification chamber where mist is produced and an outlet through which the mist produced in the humidification chamber flows;

a humidification flow path to which mist released through the outlet is admitted, and which extends from a top of the outlet and connects to the discharge opening;

a guide disposed between the outlet and the humidification flow path and including a guide wall that slopes upward toward the humidification flow path from the outlet;

a water reservoir that supplies water to the humidification assembly, and is spaced upward from the outlet; and a guide rim protruding toward the humidification flow path from the water reservoir and extending along a circumference of the water reservoir.

14. The humidifier of claim 13, wherein the guide includes:

a guide side wall protruding upward from the guide wall; and an edge connecting the guide wall and the guide side wall, wherein the guide rim horizontally faces the edge.

15. The humidifier of claim 13, wherein the outlet is connected to the guide at a position spaced from a center of the guide, and a length that the guide rim protrudes toward the humidification flow path becomes larger as the guide rim becomes closer to the outlet.

16. A humidifier comprising:

a case with an intake opening;

a discharge opening that opens toward the outside of the case;

a fan disposed inside the case;

a humidification assembly including a humidification chamber where mist is produced and an outlet through which the mist produced in the humidification chamber flows;

a water reservoir that supplies water to the humidification assembly, spaced upward from the outlet;

a humidification flow path formed between the outlet and the discharge opening, that extends to surround the water reservoir; and a guide rim protruding toward the humidification flow path from the water reservoir and extending in the direction in which the humidification flow path extends, wherein the length the guide rim protrudes toward the humidification flow path becomes larger as the guide rim becomes closer to the outlet.

17. The humidifier of claim 16, wherein the water reservoir includes a water reservoir lower wall vertically facing the outlet, and the guide rim protrudes from the water reservoir lower wall, radially outward from the water reservoir.

18. The humidifier of claim 16, wherein the humidification flow path has a cylindrical shape that surrounds the water reservoir, and the guide rim is disposed at the bottom of the humidification flow path and has a ring shape.

19. The humidifier of claim 16, wherein the outlet corresponds to a position spaced from the center of the guide rim.

* * * * *